US008150942B2

(12) United States Patent
Kindberg et al.

(10) Patent No.: US 8,150,942 B2
(45) Date of Patent: Apr. 3, 2012

(54) CONVEYING ACCESS TO DIGITAL CONTENT USING A PHYSICAL TOKEN

(75) Inventors: Timothy P. Kindberg, Burlingame, CA (US); Rakhl S. Rajani, Sunnyvale, CA (US); Mirjana Spasojevic, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2818 days.

(21) Appl. No.: 10/683,757

(22) Filed: Oct. 10, 2003

(65) Prior Publication Data

US 2005/0081135 A1    Apr. 14, 2005

(51) Int. Cl.
*G06F 15/16* (2006.01)
(52) U.S. Cl. ...................................... 709/218
(58) Field of Classification Search .............. 709/246, 709/236, 217, 218
See application file for complete search history.

(56) References Cited

U.S. PATENT DOCUMENTS

| 5,490,217 A | 2/1996 | Wang et al. |
| 6,173,239 B1 | 1/2001 | Ellenby |
| 2002/0165987 A1* | 11/2002 | Arisaka et al. ............... 709/246 |

FOREIGN PATENT DOCUMENTS

| EP | 1187078 | 3/2002 |
| WO | WO98/20411 | 5/1998 |

OTHER PUBLICATIONS

Richard Harper and Abigail Sellen, "Paper-Supported Collaborative Work," 1995, Technical Report EPC-1995-109, Xerox Ltd., pp. 1-16.
Tim Kindberg, "Implementing Physical Hyperlinks Using Ubiquitous Identifier Resolution," May 7-11, 2002, http://www2002.org/CDROM/refereed/485/index.html.
Tim Kindberg, "The 'tag' URI scheme and URN namespace," Internet Draft, Sep. 2002, http://www.ietf.org/internet-drafts/draft-kindberg-tag-uri-04.txt.
"Tag URI," http://www.taguri.org.
http://paperclick.com.
http://wiziway.com.
"Distributing Uniform Resource Locators as Bar Code Images"—IBM Technical Disclosure Bulletin—IBM Corp.—1996—p. 167.

* cited by examiner

*Primary Examiner* — Adnan Mirza (57) ABSTRACT

An exemplary method for conveying access to digital content using a physical token comprises receiving a first identifier, receiving a second identifier, determining whether any of the first and second identifiers is associated with digital content, associating the digital content associated with one of the first and second identifiers with another of the first and second identifiers, and enabling a conveyance of the another of the first and second identifiers as a physical token.

39 Claims, 8 Drawing Sheets

CONVEYING ACCESS TO DIGITAL CONTENT USING A PHYSICAL TOKEN

BACKGROUND

Collections of digital content are typically not as readily transferable as tangible objects. For example, digital content can be conveyed by sending an electronic copy of the content, or a link to the digital location of the content, to the recipient. This typically cannot be done in real time (e.g., at a meeting) unless a computing device having appropriate network and/or file access (e.g., connected to the Internet) is available. For ease of explanation, "digital content" as used throughout this patent include, without limitation, text, images, audio, video, Web pages, other electronic resources, other digital media, links to Web-based services and operations, etc.

Some digital content, such as digital text and images, may be converted to physical form (e.g., printed). Such digital content may be conveyed in real time (e.g., at a meeting) by physically handing over a printed copy. However, printing a large amount of digital content is impractical, and the result is cumbersome to transport. Moreover, some digital content (e.g., audio content, Web pages having hypertext links, etc.) cannot be easily converted to physical form.

Thus, a market exists for a practical way to represent on a tangible medium, and physically convey, digital content.

SUMMARY

An exemplary method for creating conveyable physical representations of digital content comprises receiving a request to associate an identifier with an item of digital content, obtaining an identifier, determining an address of the digital content, associating the identifier with the address, and generating a physically conveyable representation of the identifier.

An exemplary method for conveying access to digital content using a physical token comprises receiving a first identifier, receiving a second identifier, determining whether any of the first and second identifiers is associated with digital content, associating the digital content associated with one of the first and second identifiers with another of the first and second identifiers, and enabling a conveyance of the another of the first and second identifiers as a physical token.

Other embodiments and implementations are also described below.

DETAILED DESCRIPTION

I. Overview

Exemplary technologies for associating identifiers with digital content, conveying access to digital content using a physical token, and accessing the conveyed digital content using a physical token are described herein.

Section II describes an exemplary operating environment for various embodiments to be described herein.

Section III describes an exemplary process for associating identifiers, which can be conveyed via a physical token, to digital content.

Section IV describes an exemplary process for conveying digital content using a physical token.

Section V describes an exemplary process for accessing the conveyed digital content using the physical token.

Section VI describes exemplary processes for generating contextual identifiers to identify digital content, and accessing the digital content using contextual identifiers.

II. An Exemplary Operating Environment

Figure 1:
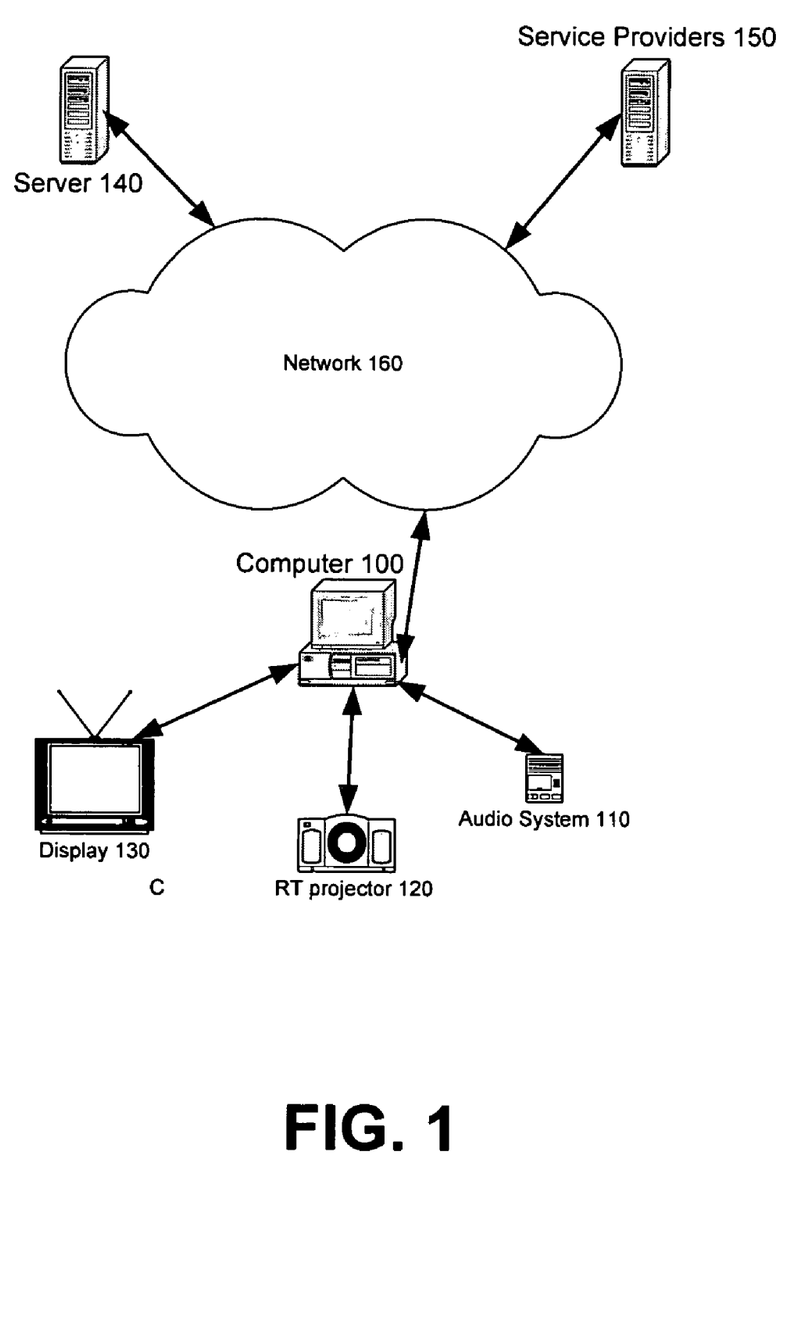
FIG. 1 illustrates an exemplary operating environment for enabling physical portability and conveyance of digital content.

FIG. 1 is a block diagram of an exemplary operating environment. The description of FIG. 1 is intended to provide a brief, general description of one common type of computing environment in conjunction with which the various exemplary embodiments described herein may be implemented.

Of course, other types of operating environments may be used as well. For example, those skilled in the art will appreciate that other computer system configurations, including hand-held devices, multiprocessor systems, microprocessor-based or programmable consumer electronics, network PCs, minicomputers, mainframe computers, and the like may also be implemented.

Further, various embodiments described herein may also be practiced in distributed computing environments where tasks are performed by remote processing devices that are linked through a communications network. In a distributed computing environment, program modules may be located in both local and remote memory storage devices.

The exemplary operating environment of FIG. 1 includes a general purpose computing device in the form of a computer 100. The computer 100 may be a conventional desktop computer, laptop computer, handheld computer, distributed computer, or any other type of computing device.

The computer 100 may include a disk drive such as a hard disk (not shown), a removable magnetic disk, a removable optical disk (e.g., a CD ROM), and/or other disk and media types. The drive and its associated computer-readable media provide for storage of computer-readable instructions, data structures, program modules, and other instructions and/or data for the computer 100. It should be appreciated by those skilled in the art that any type of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the computer 100. Exemplary program modules include an operating system, one or more application programs, other program modules, and/or program data.

A user may enter commands and information into the computer 100 through input devices such as a keyboard, a mouse, and/or a pointing device. Other input devices could include an identifier reading device (e.g., a bar code scanner, etc.), microphone, joystick, game pad, satellite dish, scanner, and/or still other devices. A monitor or other type of display device may also be connected to computer 100. Alternatively, or in addition to the monitor, computer 100 may include other peripheral output devices, such as an audio system 110, projector 120, display 130 (e.g., television), or printers (not shown), etc.

The computer 100 may operate in a networked environment using logical connections to one or more remote computers. The remote computers may be another computer, a server, a router, a network PC, a client, and/or a peer device, each of which may include some or all of the elements described above in relation to the computer 100.

In FIG. 1, the computer 100 is connected to server 140 and service provider 150 via a communication network 160. The communication network 160 could include a local-area network (LAN) and/or a wide-area network (WAN). Such networking environments are commonplace in offices, enterprise-wide computer networks, intranets and the Internet. The network configuration shown is merely exemplary, and other technologies for establishing communications links among the computers may also be used.

The embodiments described herein may be implemented in an operating environment comprising software installed on a computer, in hardware, or in a combination of software and hardware. Generally, the programmed logic may be implemented in any combination of hardware and/or software. In the case of software, the terms program, code, module, software, and other related terms as used herein may include routines, programs, objects, components, data structures, etc., that perform particular tasks or implement particular abstract data types.

III. Associating Digital Content to Identifiers

Figure 2:
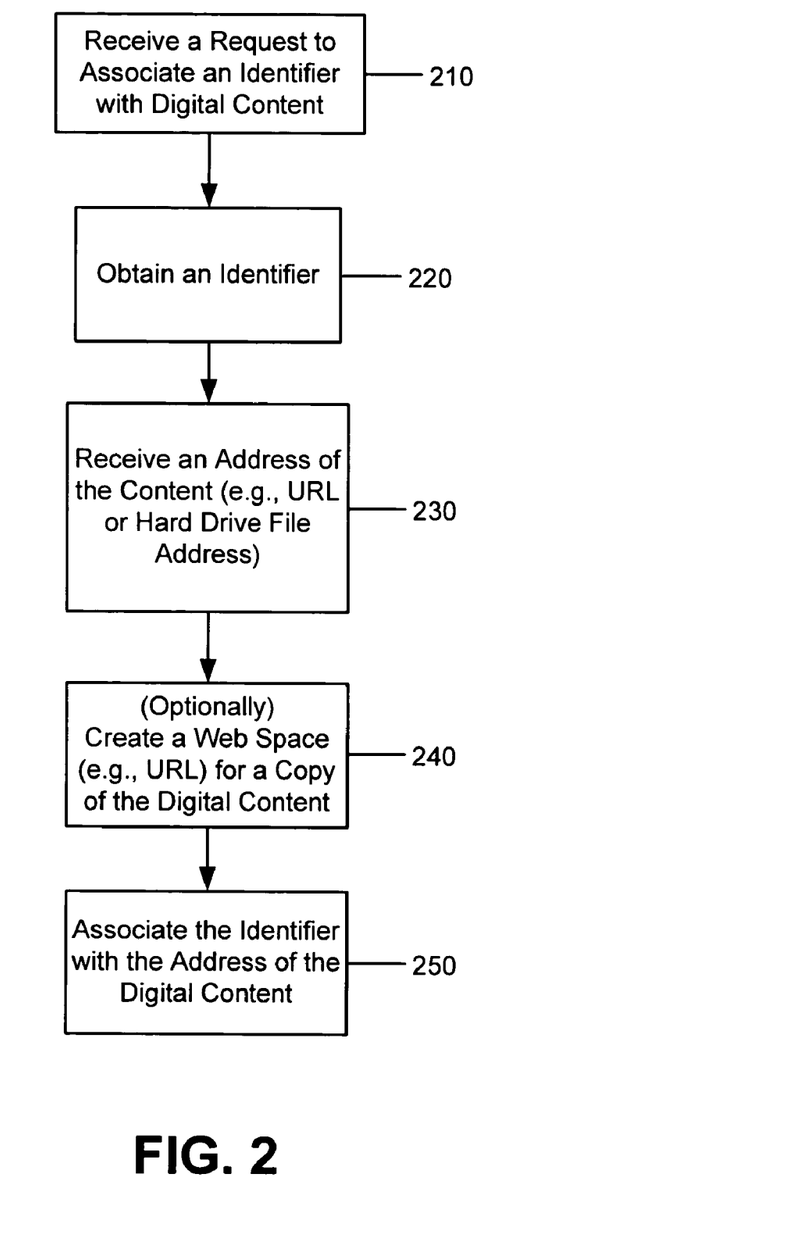
FIG. 2 illustrates an exemplary process for associating an identifier, which is conveyable via a physical token, with an item of digital content.

FIG. 2 illustrates an exemplary process for associating identifiers, which can be conveyed as physical tokens, to digital content.

At step 210, a request to associate an identifier with an item of digital content is received by a server 140. For example, the user may access the server's Web page via computer 100 that is connected to the network 160, and manually enter a request.

At step 220, a unique identifier is obtained. In an exemplary implementation, the server 140 has access to an identifier-generating service provider 150 connected to the network 160. In another exemplary implementation, the server 140 is itself capable of generating unique identifiers. Technologies for generating unique identifiers are known in the art and need not be described in more detail herein. As an example of one such technology, see "The 'tag' URI Scheme and URN Namespace," Kindberg, T., and Hawke, S., at http://www.i-etf.org/internet-drafts/draft-kindberg-tag-uri-04.txt. Many other examples are also known in the art and need not be referenced or described herein. Exemplary unique identifiers can be represented as, without limitation, bar codes, radio frequency (RF) IDs, etc. An identifier may be globally unique or contextually unique. Exemplary implementations of the latter will be described in more detail in Section VI below.

At step 230, an address of the content to be associated with the identifier is received by the server 140. In an exemplary implementation, a blank field may be provided to the user on a computer screen for entering a URL, or a file name for a file in the local hard disk (e.g., by allowing the user to browse its hard disk).

At step 240, if the content is located in a local hard disk, the server 140 may optionally create a remote Web space for storing a copy of the content. In this implementation, the Universal Resource Locator (URL) of the Web space will be associated with the identifier. This implementation may provide better security for the user so that people given permission to access the specific content will not have the ability to access the user's hard disk. This implementation may also provide improved accessibility for recipients of the digital content, especially if the remote Web space is continuously accessible to the recipient.

At step 250, the address of the content entered at step 230 is associated with the identifier obtained at step 220.

Figure 3:
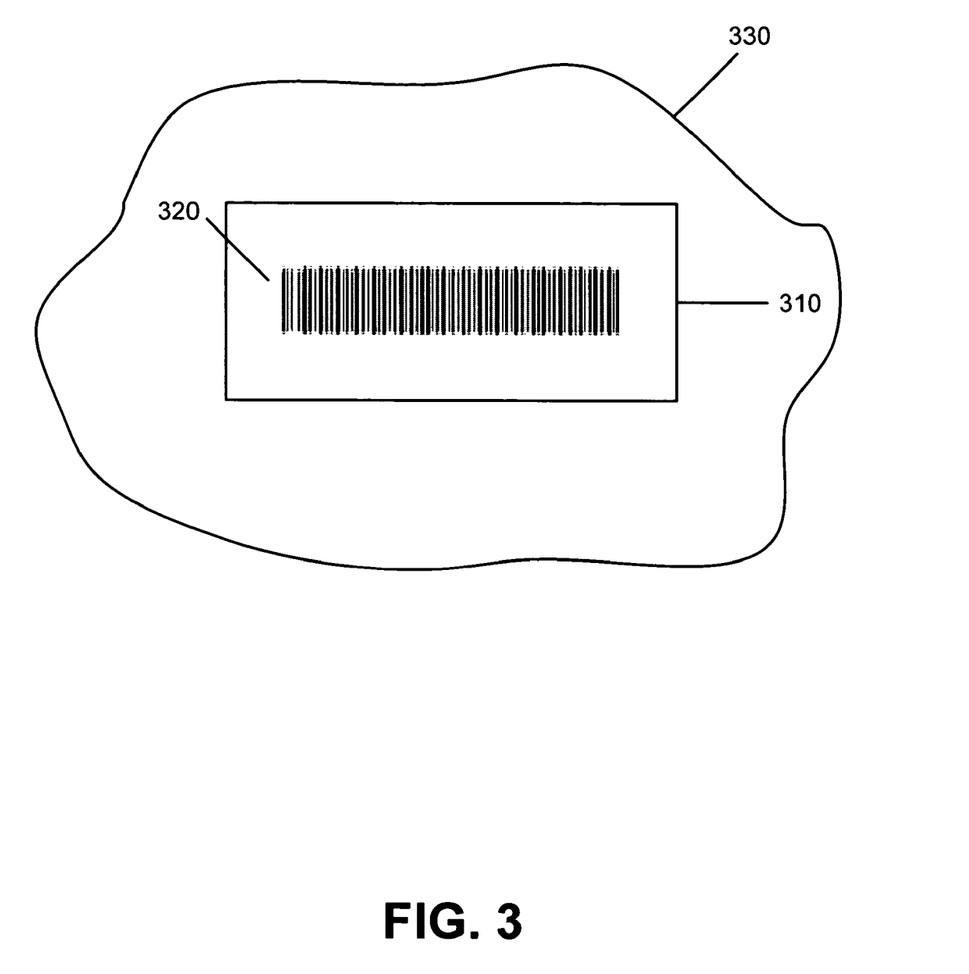
FIG. 3 illustrates an exemplary tangible medium containing an identifier that represents digital content, the medium being optionally located on a substrate.

Each address to an item of digital content may be associated with a respective identifier. These identifiers can be readily represented on tangible media and physically conveyed. FIG. 3 illustrates an exemplary tangible medium 310 containing an identifier 320 that represent digital content. The tangible medium 310 may reside on an optional substrate 330. The tangible medium 310, either per se or in connection with the substrate 330, can be handled and/or conveyed to a recipient as a physical token.

An exemplary process for conveying access to digital content using a physical token is described in Section IV below.

IV. Conveying Access to Digital Content Using a Physical Token

Figure 4:
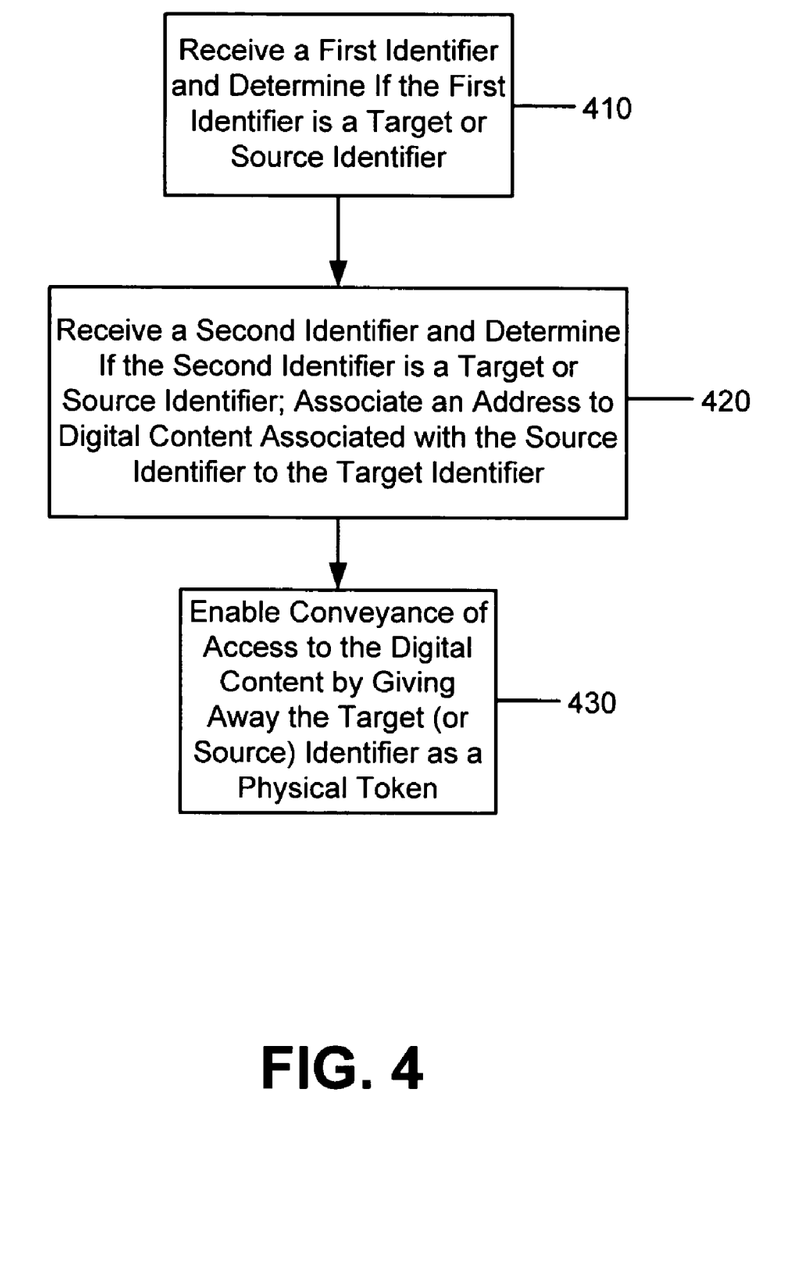
FIG. 4 illustrates an exemplary process for conveying access to digital content using a physical token.

FIG. 4 illustrates an exemplary process for conveying access to digital content using a physical token.

A user having a collection of digital content, each item of digital content having an associated identifier (for convenience, also referred to as a source identifier), may readily convey any item of digital content in the collection as follows. In an exemplary implementation, the user may request the server 140 (or other service provider 150) to generate one or more identifiers not yet associated with any content, or identifiers whose associations with content can be erased then re-associated with new content (for convenience, also referred to as a target identifier). The user may convey access to an item of digital content to another party by using one of the target identifiers as described below.

At step 410, a first identifier is read (e.g., by a bar code scanner or other commercially available identifier reading device(s)). In general, this identifier could be either the source identifier or the target identifier. If it is the target identifier, it could either be a newly generated but not yet associated identifier, or a preexisting associated identifier to be erased and reassociated. In an exemplary implementation, the target identifier is printed on a sticker (or other form of tangible medium) that can be peeled and pasted on any substrate (e.g., a business card, a mug, or other physical object). Or, the target identifier could be directly imprinted on the physical object—which would then be regarded as the tangible medium. In one implementation, the first identifier is provided to the server 140 via a computing device, such as the computer 100, through the network 160. In another implementation, the identifier reading device (e.g., bar code scanner) itself may have computing capabilities and may provide the first identifier to the server 140 via the network 160.

Depending on the user's selection, the first identifier could be either a source or a target. Its status can be determined according to whether there is any content associated with it.

If the first identifier is unassociated, it must be a target, and the server 140 will query the user to request an association of content with the first identifier. But if the first identifier is associated with content, it could either be a source or a target. In that case, the server 140 will query the user to determine whether the user wishes to delete the associated content from the first identifier to enable re-association (i.e., the first identifier is a target) and/or whether the user wishes to associate the content associated with the first identifier with an unassociated identifier to be provided (i.e., the first identifier is a source). The query may be displayed on a computer screen or may be played on an audio device (e.g., audio system 110).

At step 420, a second identifier is read (e.g., by a portable bar code scanner or other commercially available identifier reading device(s)). In an exemplary implementation, the second identifier is simply assumed to be a source identifier if the first identifier was a target identifier, and vice versa. Alternatively, a similar status determination process as described above could be performed. In any event, the second identifier is provided to the server 140 which associates the address (e.g., URL) of the item of digital content associated with the source identifier with the target identifier. In an exemplary implementation, the item of digital content can be copied by the server 140. In this implementation, the address of the copy could be associated with the target identifier.

At step 430, access to the item of digital content associated with the target identifier can be conveyed as a physical token, while retaining the source identifier. In an exemplary implementation, the target identifier is printed on a sticker that may be peeled off and pasted on a physical object. As a security measure, in an exemplary implementation, the user can orally or otherwise separately give a password to regulate access to the content. This security measure can be implemented using password verification technologies known in the art.

As an alternative to giving away the target identifier, since both the source and target identifiers are now associated with the same digital content, the user could convey the source identifier and retain the target identifier. Or, if the user wishes to retain neither, the user could convey both source and target identifiers, to either the same or different recipients.

The process described above is merely illustrative. One skilled in the art will recognize that still other processes may be implemented to convey access to digital content using a physical token. For example, digital content in a collection may be pre-associated with multiple unique identifiers so that a user can give away any item of digital content in the collection spontaneously without having to perform the associations described above in real time.

The timing and sequence of steps in the process described above are merely illustrative. The exemplary process assumes that the identity of the first identifier is unknown. In an alternate implementation, the system could be programmed to always recognize the first identifier as the source and the second as the target, or vice versa. Finally, it should be understood that an identifier can be associated with more than one item of digital content. For example, a single identifier may be associated with multiple items within, or even an entire, digital collection.

V. Accessing Conveyed Digital Content Using a Physical Token

Figure 5:
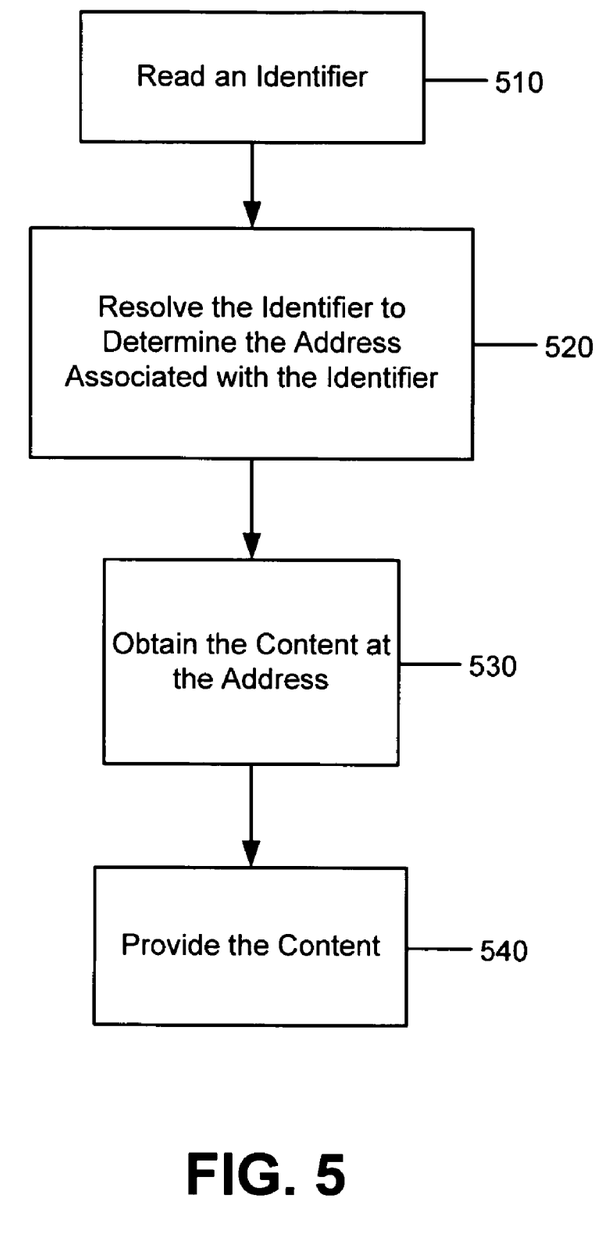
FIG. 5 illustrates an exemplary process for accessing conveyed digital content using a physical token.

FIG. 5 illustrate an exemplary process for accessing conveyed digital content using a physical token.

At step 510, an identifier on a physical token (e.g., an identifier printed on a sticker) is read (e.g., by a portable bar code scanner, etc.). In an exemplary implementation, the identifier is provided to the server 140 by the computer 100 connected to the network 160. In another exemplary implementation, the identifier reading device (e.g., bar code scanner) itself may have computing capabilities and may provide the identifier to the server 140 via the network 160.

At step 520, the server 140 resolves the identifier to determine any address (e.g., URL) of digital content associated with the identifier. In one implementation, the user may be requested to enter a password before being given access to any digital content associated with the identifier.

At step 530, based on the address of the digital content associated with the identifier, the server 140 obtains the content.

At step 540, the server 140 provides the content to the user via the network 160. In an exemplary implementation, the content (e.g., an image, text, etc.) is displayed on a computer screen or other form of display 130. In another exemplary implementation, the content is otherwise provided via another form of output device (e.g., playing or streaming audio data to an audio system 110).

The process steps illustrated above are merely exemplary. Those skilled in the art will appreciate that other steps may be used in accordance with the requirements of a particular implementation.

VI. Using Contextual Identifiers to Identify Digital Content

As described in various exemplary embodiments above, unique identifiers (e.g., bar codes, RF ID tags, glyphs, etc.) can be used to identify digital content and access to the digital content may be conveyed by giving away the identifiers via physical tokens. For example, each item of digital content in a collection can be identified by a unique bar code printed on a piece of paper (see FIG. 3). Sometimes, the size of the physical token, or the desire to place multiple identifiers on a single token, may favor smaller identifiers. At the same time, the identifiers must be unique to avoid ambiguity. Uniqueness can be global, or contextual. The contextual identifiers need not be globally unique, as long as the environment in which they are used is globally unique (and so identifiable). Contextual identifiers may be made smaller relative to the length of globally unique identifiers.

Figure 6:
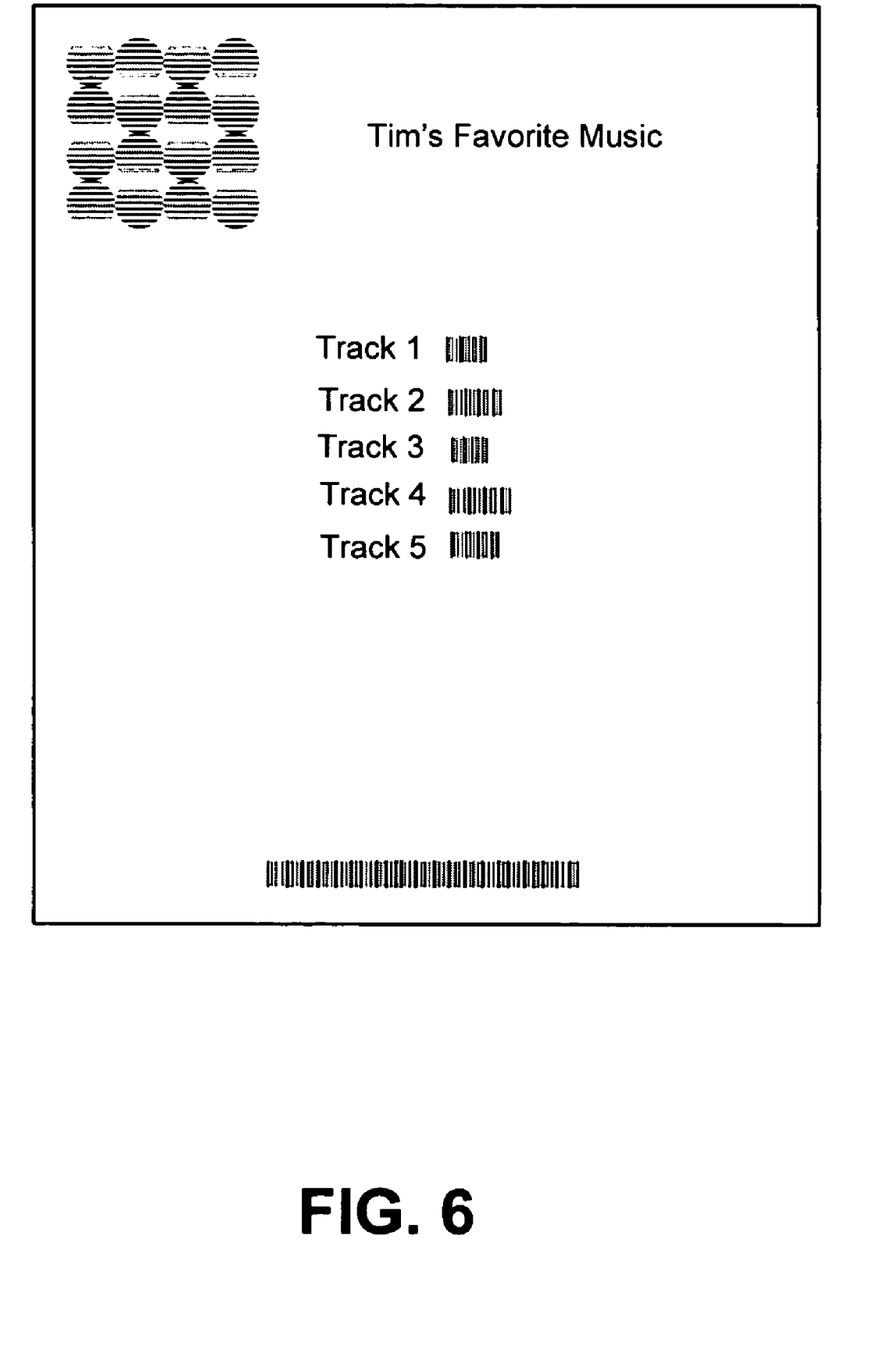
FIG. 6 illustrates an exemplary tangible medium identified by a unique identifier and contextual identifiers, which identify links to digital content, on the tangible medium.

In an exemplary implementation of contextual identifiers, a particular tangible medium representing a collection of digital content may be identified by a globally unique identifier, while individual items of digital content within the collection can be identified by a single-character (e.g., 0, 1, 2, etc.) contextual identifier. The contextual identifier uniquely identifies any item of content within the collection, which in turn is uniquely identified by the globally unique identifier. FIG. 6 illustrates an exemplary tangible medium implementing contextual identifiers to identify digital content.

Figure 7:
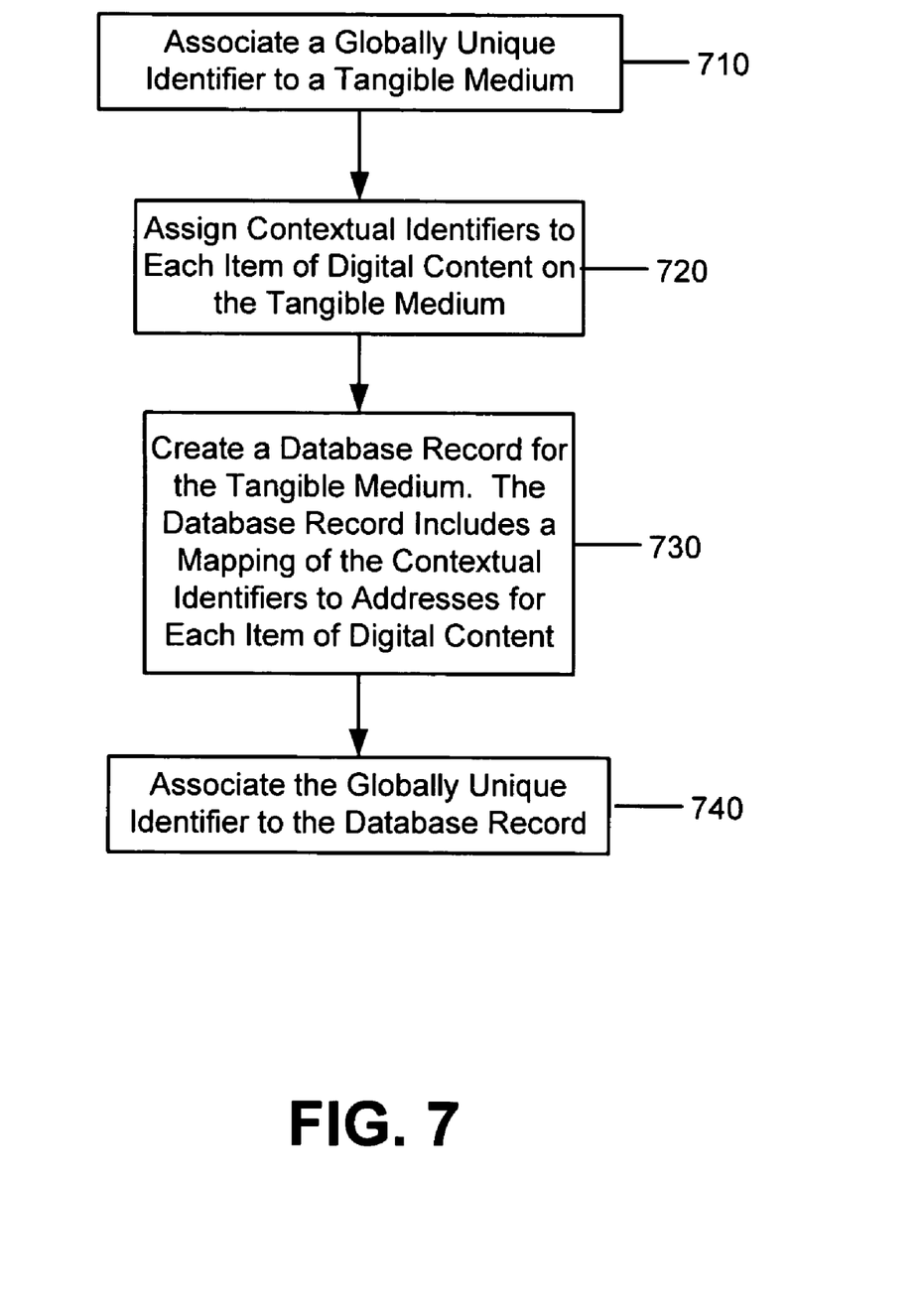
FIG. 7 illustrates an exemplary process for associating contextual identifiers with digital content.

A. An Exemplary Process to Associate Contextual Identifiers with Digital Content FIG. 7 illustrates an exemplary process for associating contextual identifiers with digital content.

At step 710, a globally unique identifier is associated with a tangible medium representing a collection of digital content. In an exemplary implementation, a globally unique identifier can be represented as a unique bar code which may be physically associated with the tangible medium by physically affixing or otherwise printing the globally unique identifier on the tangible medium. The globally unique identifier may be digitally associated with the tangible medium by creating a database record (e.g., by the server 140) to associate the identifier with a description of the tangible medium (e.g., Tim's Photo Collection). Globally unique identifiers can be generated using technologies known in the art and need not be described in more detail herein.

At step 720, contextual identifiers are assigned to each item of digital content in the collection represented by the tangible medium. In an exemplary implementation, the contextual identifiers may be alphanumeric characters (or bar codes representing alphanumeric characters) assigned to different items of digital content in the collection. These contextual identifiers can be printed on or otherwise affixed to the tangible medium.

At step 730, a database record is created for the tangible medium to provide a mapping of the contextual identifiers to corresponding addresses associated with each item of digital content in the collection.

At step 740, the globally unique identifier is associated with the database record so that the database record may be accessed when the globally unique identifier is read (e.g., by a bar code scanner). For example, when a globally unique identifier associated with a tangible medium is read, the corresponding database record created for that tangible medium is located. Subsequently, when a contextual identifier on the tangible medium is read, the database record is accessed to look up the address of the digital content associated with the contextual identifier.

The foregoing exemplary process for generating contextual identifiers for identifying digital content in a collection is merely illustrative. One skilled in the art will recognize that other processes or sequence of steps may be implemented to derive contextual identifiers in connection with a globally unique identifier. Further, one skilled in the art will also recognize that the exemplary process may be applicable in other contexts to identify multiple items in a group that is itself identified by a unique identifier. For example, contextual identifiers may be used to identify multiple collections in a library of collections, etc. More generally, then, the combination of a contextual identifier with a globally unique identifier can be regarded as an example of the use of multilevel, or hierarchical, identifiers.

B. An Exemplary Process for Conveying Access to Digital Content Identified by Contextual Identifiers Similar to the exemplary process described above in FIG. 4, to convey access to an item of digital content, a user may use a target identifier generated by a server 140 or service provider 150. The target identifier can be associated with the address to the item of digital content then given away as a physical token.

In an exemplary implementation, if the item of digital content is identified by a contextual identifier rather than a globally unique identifier, the server 140 first obtains a reading of a globally unique identifier identifying the tangible medium where the contextual identifier is located. Using the globally unique identifier, the server 140 can locate the database record created previously for the tangible medium. The database record includes a mapping of all contextual identifiers on the tangible medium to corresponding addresses of items of digital content. When a contextual identifier on the tangible medium is read, the database record is accessed to locate the address to the item of digital content associated with that contextual identifier. This way, a target identifier may be associated with the address of the item of digital content and access to the digital content may be conveyed using the target identifier (via a physical token).

Figure 8:
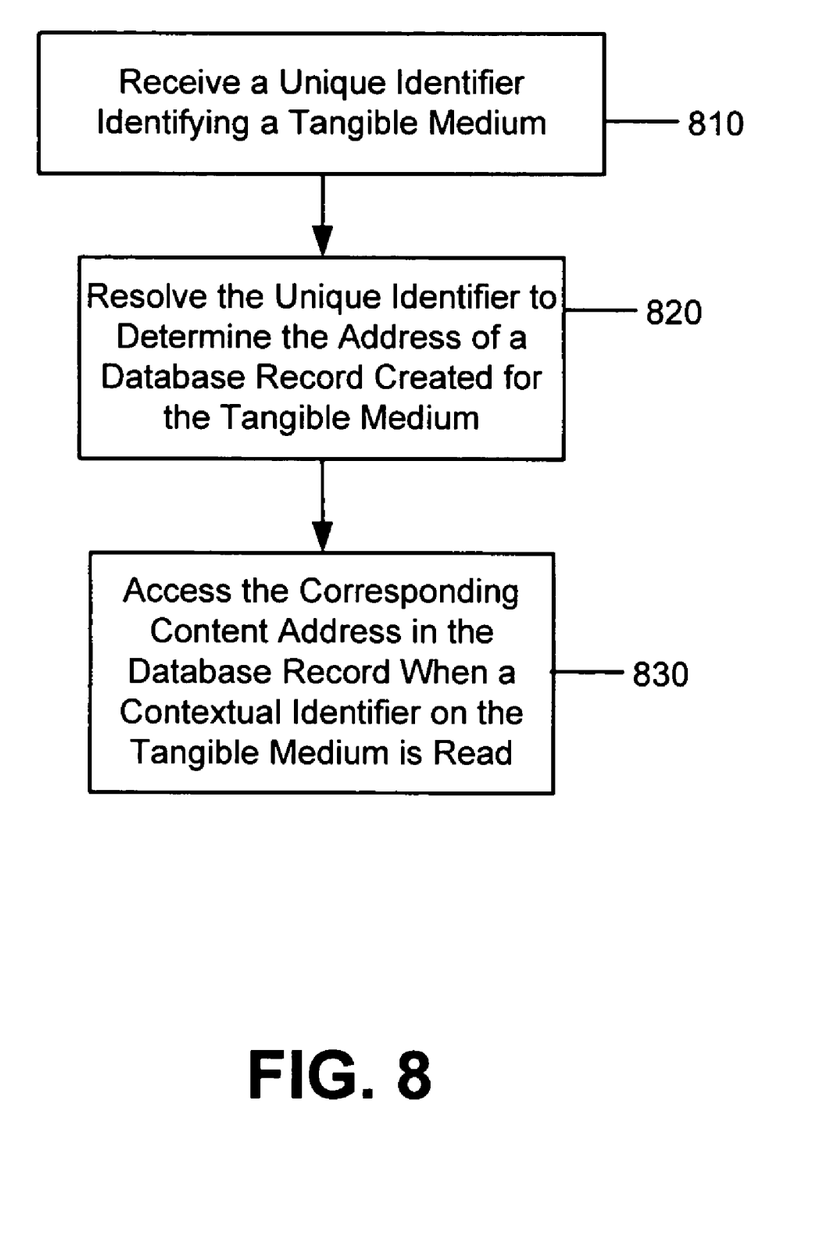
FIG. 8 illustrates an exemplary process for accessing digital content being identified by contextual identifiers.

C. An Exemplary Process for Accessing Digital Content Identified by Contextual Identifiers FIG. 8 illustrates an exemplary process for accessing digital content identified by contextual identifiers.

At step 810, a globally unique identifier identifying a tangible medium (e.g., a piece of printed paper) is read (e.g., by a portable bar code scanner, etc.). The globally unique identifier is provided to the server 140 via the network 160.

At step 820, the identifier is resolved by the server 140 by looking up the address of a database record previously generated for the tangible medium (see step 730 above). Technologies for resolving identifiers are known in the art and need not be described in more detail herein. As an example of one such technology, see "*Implementing physical hyperlinks using ubiquitous identifier resolution*", T. Kindberg, 11th International World Wide Web Conference, at http://www2002.org/CDROM/refereed/485/index.html. Many other examples are also known in the art and need not be referenced or described herein. In an exemplary implementation, the database record contains a mapping of contextual identifiers on the tangible medium to addresses of corresponding digital content associated with the contextual identifiers.

At step 830, each time a contextual identifier on the tangible medium is read, the appropriate content is obtained from the corresponding address in the database record.

D. Other Applications of Contextual Identifiers

Some viewable digital content, such as a Web page or an image, may also include links (e.g., hypertext links) to other digital content. If the user were connected to a network 160 (e.g., the Internet), the user could select a link on the computer screen, to display (or otherwise output) the digital content associated with that link. However, selectable links are useless in a printed format. That is, a user cannot access the digital content associated with the links indicated in the printed format by selecting those links.

However, if the links on a printed Web page are all associated with respective identifiers, the digital content associated with such links may be made accessible. Globally unique identifiers may be implemented to enable access to the Web page, and contextual identifiers may be associated with the links on the printed Web page by implementing the process described above in FIG. 7.

VII. Conclusion

The foregoing examples illustrate certain exemplary embodiments from which other embodiments, variations, and modifications will be apparent to those skilled in the art. The inventions should therefore not be limited to the particular embodiments discussed above, but rather are defined by the claims. Furthermore, some of the claims may include alphanumeric identifiers to distinguish the elements thereof. Such identifiers are merely provided for convenience in reading, and should not necessarily be construed as requiring or implying a particular order of steps, or a particular sequential relationship among the claim elements.

What is claimed is:

1. A method for creating conveyable physical representations of digital content, comprising: receiving a request to associate an identifier with an item of digital content; obtaining an identifier; determining an address of said digital content; associating said identifier with said address; and generating a physically conveyable representation of said identifier.

2. The method of claim 1, wherein said determining includes providing a blank field to a user for providing said address.

3. The method of claim 1, further comprising: creating a Web space for said digital content; and using an address to said Web space as said address of said digital content.

4. The method of claim 1, wherein said generating includes representing said identifier on a tangible medium.

5. The method of claim 4, wherein said tangible medium resides on a substrate.

6. A method for creating conveyable physical representations of digital content, comprising: receiving a request to associate an identifier with an item of digital content; associating a globally unique identifier to a tangible medium; assigning a contextual identifier to said item of digital content, said contextual identifier is unique in the context of said globally unique identifier; creating a database record for said tangible medium, said database record including a mapping of said contextual identifier to an address to said digital content; associating said globally unique identifier to said database record; and associating said contextual identifier with said tangible medium.

7. The method of claim 6, wherein said associating a globally unique identifier to a tangible medium includes physically affixing said globally unique identifier on said tangible medium.

8. The method of claim 6, wherein said associating a globally unique identifier to a tangible medium includes digitally associating a description of said tangible medium to said globally unique identifier.

9. The method of claim 6, wherein said associating said contextual identifier with said tangible medium includes physically affixing said contextual identifier on said tangible medium.

10. The method of claim 6, wherein said associating said contextual identifier with said tangible medium includes printing said contextual identifier on said tangible medium.

11. A method for conveying access to digital content using a physical token, comprising: receiving a first identifier; receiving a second identifier; determining whether any of said first and second identifiers is associated with digital content; associating said digital content associated with one of said first and second identifiers with another of said first and second identifiers; and enabling a conveyance of said another of said first and second identifiers as a physical token.

12. The method of 11, wherein said associating said digital content includes associating an address to said digital content with said another of said first and second identifiers.

13. The method of 11, wherein one of said first and second identifiers is a target identifier.

14. The method of claim 13, wherein said target identifier is unassociated with any digital content.

15. The method of claim 13, wherein said target identifier has an erasable association with certain digital content.

16. The method of claim 11, wherein one of said first and second identifiers is a source identifier.

17. The method of claim 16, wherein said source identifier is associated with an address to said digital content.

18. The method of claim 11, wherein said another of said first and second identifiers is represented on a tangible medium.

19. The method of claim 18, wherein said tangible medium resides on a substrate.

20. The method of claim 11, wherein said enabling a conveyance includes providing a password to regulate access to said digital content.

21. The method of claim 11, wherein at least one of said first and second identifiers is a contextual identifier.

22. The method of claim 21, wherein said associating includes: accessing a database record containing a mapping of said contextual identifier to an address to said digital content; and associating said address with said another of said first and second identifiers.

23. The method of 22, wherein said accessing includes: determining a globally unique identifier associated with said contextual identifier; and locating said database record based on said globally unique identifier.

24. A non-transitory computer-readable medium comprising logic instructions for creating conveyable physical representations of digital content, said logic instructions being executable to: receive a request to associate an identifier with an item of digital content; obtain an identifier; determine an address of said digital content; associate said identifier with said address; and generate a physically conveyable representation of said identifier.

25. The non-transitory computer-readable medium of claim 24, wherein said generate includes representing said identifier on a tangible medium.

26. The non-transitory computer-readable medium of claim 25, wherein said tangible medium resides on a substrate.

27. A non-transitory computer-readable medium comprising logic instructions for creating conveyable physical representations of digital content, said logic instructions being executable to: receive a request to associate an identifier with an item of digital content; associate a globally unique identifier to a tangible medium; assign a contextual identifier to said item of digital content, said contextual identifier is unique in the context of said globally unique identifier; create a database record for said tangible medium, said database record including a mapping of said contextual identifier to an address to said digital content; associate said globally unique identifier to said database record; and associate said contextual identifier with said tangible medium.

28. The non-transitory computer readable medium of claim 27, wherein said associate a globally unique identifier to a tangible medium includes digitally associating a description of said tangible medium to said globally unique identifier.

29. A non-transitory computer-readable medium comprising logic instructions for conveying access to digital content using a physical token, said logic instructions being executable to: receive a first identifier; receive a second identifier; determine whether any of said first and second identifiers is associated with digital content; associate said digital content associated with one of said first and second identifiers with another of said first and second identifiers; and enable a conveyance of said another of said first and second identifiers as a physical token.

30. The non-transitory computer-readable medium of 29, wherein said associate said digital content includes associating an address to said digital content with said another of said first and second identifiers.

31. The non-transitory computer-readable medium of claim 29, wherein said another of said first and second identifiers is represented on a tangible medium.

32. The non-transitory computer-readable medium of claim 31, wherein said tangible medium resides on a substrate.

33. The non-transitory computer-readable medium of claim 29, wherein said enable a conveyance includes providing a password to regulate access to said digital content.

34. The non-transitory computer-readable medium of claim 29, wherein at least one of said first and second identifiers is a contextual identifier.

35. The non-transitory computer-readable medium of claim 34, wherein said associate includes logic instructions being executable to: access a database record containing a mapping of said contextual identifier to an address to said digital content; and associate said address with said another of said first and second identifiers.

36. The non-transitory computer-readable medium of 35, wherein said access includes logic instructions being executable to: determine a globally unique identifier associated with said contextual identifier; and locate said database record based on said globally unique identifier.

37. Apparatus for creating conveyable physical representations of digital content, comprising: means for receiving a request to associate an identifier with an item of digital content; means for obtaining an identifier; means for determining an address of said digital content; means for associating said identifier with said address; and means for generating a physically conveyable representation of said identifier.

38. Apparatus for creating conveyable physical representations of digital content, comprising: means for receiving a request to associate an identifier with an item of digital content; means for associating a globally unique identifier to a tangible medium; means for assigning a contextual identifier to said item of digital content, said contextual identifier is unique in the context of said globally unique identifier; means for creating a database record for said tangible medium, said database record including a mapping of said contextual identifier to an address to said digital content; means for associating said globally unique identifier to said database record; and means for associating said contextual identifier with said tangible medium.

39. Apparatus for conveying access to digital content using a physical token, comprising: means for receiving a first identifier; means for receiving a second identifier; means for determining whether any of said first and second identifiers is associated with digital content; means for associating said digital content associated with one of said first and second identifiers with another of said first and second identifiers; and means for enabling a conveyance of said another of said first and second identifiers as a physical token.

* * * * *

UNITED STATES PATENT AND TRADEMARK OFFICE
CERTIFICATE OF CORRECTION

PATENT NO. : 8,150,942 B2  Page 1 of 1
APPLICATION NO. : 10/683757
DATED : April 3, 2012
INVENTOR(S) : Timothy P. Kindberg et al.

It is certified that error appears in the above-identified patent and that said Letters Patent is hereby corrected as shown below:

In the Claims:

In column 9, line 40, in Claim 12, after "method of" insert -- claim --.

In column 9, line 43, in Claim 13, after "method of" insert -- claim --.

In column 10, line 1, in Claim 23, after "method of" insert -- claim --.

In column 10, line 32, in Claim 28, delete "computer readable" and insert -- computer-readable --, therefor.

In column 10, line 46, in Claim 30, after "medium of" insert -- claim --.

In column 11, line 1, in Claim 36, after "medium of" insert -- claim --.

Signed and Sealed this
Fourth Day of December, 2012

David J. Kappos
*Director of the United States Patent and Trademark Office*